United States Patent [19]

Takeyuki

[11] Patent Number: 4,552,510

[45] Date of Patent: Nov. 12, 1985

[54] RADIAL TYPE CERAMIC TURBINE ROTOR AND METHOD OF PRODUCING THE SAME

[75] Inventor: Mizuno Takeyuki, Toyohashi, Japan

[73] Assignee: NGK Insulators, Ltd., Japan

[21] Appl. No.: 579,764

[22] Filed: Feb. 13, 1984

[30] Foreign Application Priority Data

Feb. 24, 1983 [JP] Japan .................................. 58-28632

[51] Int. Cl.⁴ ................................................ F01D 5/34
[52] U.S. Cl. ..................................... 416/241 B; 264/60
[58] Field of Search ....................... 416/241 B, 244 A; 415/214; 264/60

[56] References Cited

U.S. PATENT DOCUMENTS

| 3,887,411 | 6/1975 | Goodyear et al. | 264/60 X |
| 4,096,120 | 6/1978 | Grunke | 264/60 |
| 4,396,445 | 8/1983 | Sasaki et al. | 416/241 B |
| 4,408,959 | 10/1983 | Long et al. | 416/241 B |

FOREIGN PATENT DOCUMENTS 134701 10/1980 Japan ............................. 416/241 B

*Primary Examiner*—Robert E. Garrett
*Assistant Examiner*—Joseph M. Pitko
*Attorney, Agent, or Firm*—Parkhurst & Oliff

[57] ABSTRACT

A radial type ceramic turbine rotor comprises a shaft portion, a hub integrally connected to the shaft portion, a blade portion integrally formed on said hub, and an end surface on a gas exit side of the hub extending from an end surface of the blade portion in the proximity of the hub. According to the present invention, a fillet is formed at a circular connection between the blade portion and the hub, on the gas exit side of the rotor. The fillet has a concave surface with a radius of curvature of greater than 3 mm. The radial type ceramic turbine rotor of this invention is produced by the steps of injection molding a ceramic material in such a manner that the radius of curvature is more than 3 mm after sintering, removing a plasticizer included in the turbine rotor and sintering it under a normal pressure, thereby precluding the formation of cracks in the fillet.

8 Claims, 1 Drawing Figure

RADIAL TYPE CERAMIC TURBINE ROTOR AND METHOD OF PRODUCING THE SAME

BACKGROUND OF THE INVENTION

1. Field of the Invention

This invention relates to a high strength radial type ceramic turbine rotor, which is free from cracks in the proximity of a connection between a hub and a blade portion on an air exit side and a method of producing such a rotor.

2. Description of the Prior Art

Recently, silicon ceramic materials such as silicon nitride, silicon carbide, sialon and the like have been noticed utilized as structural materials for gas turbines, diesel engines and the like, because of their light weight and superior heat and thermal shock resistance. More particularly, radial type turbine rotors made of these ceramic materials have been highlighted for applications such as gas turbine rotors or turbo charger rotors for automobiles. Ceramic rotors are lighter and are capable of being used at much higher temperatures than metal rotors and are superior in thermal efficiency to the metal rotors. Moreover, as the radial type turbine rotors are complicated in shape, they are usually molded by injection molding or the like which forces the ceramic materials into narrow or curved portions or corners of the complicated shapes.

In order to form the rotors by injection molding the ceramic materials, it is necessary to add a great amount of plasticizer such as resin, wax or the like into the ceramic material. When the injection molded ceramic rotor body is heated or sintered to remove the resin or wax, the shape in the proximity of a connection between a hub and a blade portion on a gas exit side so rapidly changes that the resin or wax added as the plasticizer is not uniformly removed. Accordingly, the molded body is not uniform in density, so that locally different shrinkages occur in the body during sintering resulting in tensile forces which lead to cracks, particularly in the connection between the hub and blade portion on the gas exit side.

SUMMARY OF THE INVENTION

It is an object of the invention to provide an improved radial type ceramic turbine rotor and a producing method of producing the same, which prevents cracks in a circular connection between a blade portion and a hub on a gas exit side of the rotor to eliminate the above disadvantages of the prior art.

In order to achieve the above object, a radial type ceramic turbine rotor includes a shaft portion, a hub integrally connected to said shaft portion and a blade portion, an end surface of the hub on a gas exit side extending from an end surface of said blade portion in the proximity of said hub, whereby according to the invention, a fillet formed at a circular connection between said blade portion and said hub on the gas exit side of the rotor is a concave surface whose radius of curvature is more than 3 mm.

In a method of producing a radial type ceramic turbine rotor including a shaft portion, a hub integrally connected to said shaft portion and a blade portion, an end surface of the hub on a gas exit side extending from an end surface of said blade portion in the proximity of said hub, according to the invention, comprises the steps of injection molding a ceramic material to form a turbine rotor having a fillet formed at a circular connection between said blade portion and said hub on the gas exit side of the rotor being formed in a concave surface whose radius of curvature is more than 3 mm after sintering, removing a plasticizer included in the turbine rotor and sintering the turbine rotor under normal pressure.

The invention will be more fully understood by referring to the following detailed specification and claims taken in connection with the appended drawings.

DETAILED DESCRIPTION OF THE PREFERRED EMBODIMENT

Figure 1:
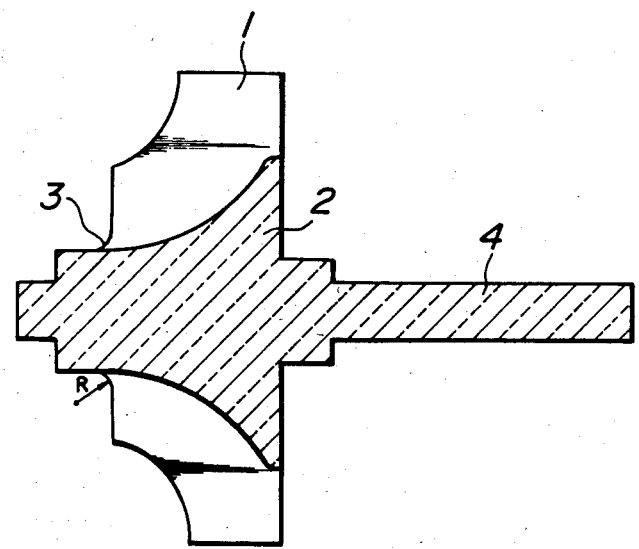
FIG. 1 is an illustration of a radial type ceramic turbine rotor having a thicker fillet portion according to the present invention.

FIG. 1 illustrates one example of a radial type ceramic turbine rotor according to the invention. The ceramic turbine rotor consists of a shaft portion 4, a hub 2 integrally connected to the shaft portion 4 and a blade portion 1 radially extending from and integrally connected to the hub 2. A gas is exhausted by the rotor in a direction from the right to the left as viewed in FIG. 1 in which direction an end of the hub 2 extends somewhat from an end of the blade portion 1. A reference numeral 3 illustrates a concave fillet formed at a circular connection between the hub 2 and the blade portion 1.

The ceramic turbine rotor according to the invention is produced in the following manner. The rotor consists essentially of at least one material selected from the group consisting of silicon nitride, silicon carbide, sialon or substances which convert to these materials by sintering, and is preferably combined with a plasticizer such as a resin, wax or the like and further preferably is added and mixed with at least one sintering aid such as $Y_2O_3$, $MgAl_2O_4$, $MgO$, $CeO_2$, $SrO$ or the like in case of the silicon nitride and such as Be, Al, B, C or the like in case of the silicon carbide to obtain a raw material for molding. This prepared raw material is injection molded by the use of injection molding dies to obtain a molded rotor body. The injection molding dies are previously adjusted so that the fillet 3 of the rotor body molded in the dies at the circular connection between the blade portion 1 and the hub 2 of the shaft portion 4 on the gas exit side of the rotor forms a concave surface whose radius of curvature is more than 3 mm, preferably not more than 10 mm, and more preferably 4–6 mm, after sintering as shown in FIG. 1.

The molded rotor body is then heated to 300°–600° C. at a heating rate slower than 100° C./hr, preferably slower than 10° C./hr, to remove the plasticizer these heating conditions being dependent upon the types and amounts of the plasticizer contained in the body. After the removal of the plasticizer, if required, hydrostatic pressure is applied to the rotor body after presintering. The presintering is effected at 800°–1,200° C. in order to facilitate handling the rotor body and give it a strength required to be machined. In applying the hydrostatic pressure, the molded rotor body after the presintering is covered by an elastic bag and then a hydrostatic pressure of 500–5,000 kg/cm² is applied to the covered rotor body to make it dense. Thereafter, the molded rotor body is sintered under a normal pressure, such as atmospheric pressure, for 10–200 minutes at a temperature, for example, of 1,600°–2,200° C. which is sufficient to sinter the body completely depending upon the raw material. When using as a starting material a substance which produces silicon nitride, silicon carbide or sialon during sintering, important parameters for obtaining good results are not only the sintering temperature, but also the atmosphere for sintering. For example, a nitrogen atmosphere is used for silicon nitride and an argon atmosphere for the silicon carbide. In this manner, the obtained radial type ceramic turbine rotor has the fillet 3 formed at the circular connection between the blade portion 1 and the hub 2 on the gas exit side of the rotor, which is a concave surface having a radius of curvature more than 3 mm, without the formation of cracks in the fillet after sintering. Alternatively, the fabricating process may be made of the process which is disclosed in copending U.S. Pat. No. 4,460,527, assigned to the same assignee of the present application, the disclosure of which is hereby incorporated by reference.

Moreover, the reason why the fillet 3 formed at the circular connection between the blade portion and the hub on the gas outlet side after sintering is formulated to have a radius of curvature of more than 3 mm, is that when a radius of curvature of the fillet is less than 3 mm, an abrupt change in thickness of the fillet results which causes, uneven plasticizer removal and therefore uneven density in the fillet. The uneven density also causes locally different shrinkages in the fillet, so that cracks occur in the fillet due to tensile stresses. A curvature of not more than 10 mm is preferable, because a curvature of more than 10 mm generally tends to lower the aerodynamic characteristics of the rotor.

The effect of the invention will be explained with reference to examples hereinafter.

For preparing a raw material for injection molding, the following materials were mixed and kneaded, 100 parts by weight of powder $Si_3N_4$ having an average grain diameter 0.5 μm, 3 parts by weight of MgO, 2 parts by weight of SrO and 2 parts by weight of $CeO_2$ as sintering aids and 15 parts by weight of polypropylene resin as a plasticizer. The thus obtained material was injection molded with dies to form ceramic turbine rotors each having a maximum blade diameter 60 mm (after firing) and a radius of curvature as shown in Table 1 of the fillet at a connection between a hub and blade portion on a gas exit side of the rotor. Thereafter, the molded rotor bodies were heated to 500° C. at a heating rate 5° C./hr and further heated at 500° C. for 10 hours for removing the plasticizer, and then the rotor bodies kept in rubber bags were subjected to hydrostatic pressure at 3,000 kg/cm². The bodies were then sintered in nitrogen atmosphere at 1,720° C. for 30 minutes.

State of cracks occurred in the rotors are added in the Table 1. With the rotors (samples Nos. 1–4) having more than 3 mm radii of curvatures at fillets at connections between hubs and blade portions on gas exit sides of the rotors according to the invention, no crack occurred, while with rotors (samples Nos. 5 and 6) having radii less than 3 mm of curvatures at fillets, cracks having lengths of 3 and 6 mm occurred, respectively.

In order to perform rotating tests, these rotors were ground to be dynamically balanced up to a dynamic unbalance of 0.05 g·cm. After metal shafts had been secured to the rotors, they were again adjusted up to a dynamic unbalance of 0.001 g·cm. The rotors were then tested on a rotation testing machine progressively increasing its rotating speed. The rotors Nos. 1–4 according to the invention did not rupture even at 150,000 RPM, while the conventional rotors Nos. 5 and 6 ruptured at approximately 70,000 RPM.

TABLE 1

| Sample No. | Radius of curvature at fillet mm | Occurrence of crack and its length mm | Result of rotating test |
| --- | --- | --- | --- |
| Rotor according to the present invention | | | |
| 1 | 10 | no | did not rupture at 150,000 RPM |
| 2 | 6 | no | did not rupture at 150,000 RPM |
| 3 | 4.5 | no | did not rupture at 150,000 RPM |
| 4 | 3 | no | did not rupture at 150,000 RPM |
| Conventional rotor | | | |
| 5 | 2 | yes, 3 | ruptured at 70,000 RPM |
| 6 | 0.5 | yes, 6 | ruptured at 50,000 RPM |

As can be seen from the above description, according to the invention, the radial type ceramic turbine rotor is integrally formed by injection molding so as to have more than a 3 mm radius of curvature at a fillet at a connection between a hub and a blade portion on a gas exit side of the rotor, thereby to obtain a high strength ceramic turbine rotor completely precluding cracks particularly in the fillet where cracks are apt to occur. The rotor according to the invention is suitable for a turbo-charger rotor for diesel and gasoline engines and a rotor for gas turbine engines and very useful for industries.

While the invention has been particularly shown and described with reference to preferred embodiments thereof, it will be understood by those skilled in the art that the foregoing and other changes in form and details can be made without departing from the spirit and scope of the invention.

What is claimed is:

1. A radial type ceramic turbine rotor comprising a shaft portion, a hub integrally connected to said shaft portion, a blade portion integrally formed on said hub, an end surface on a gas exit side of the hub extending from an end surface of said blade portion in the proximity of said hub, and a fillet formed at a circular connection between said blade portion and said end surface on the gas exit side of the hub, said fillet comprising a concave surface having a radius of curvature of greater than 3 mm.

2. The radial type ceramic turbine rotor as set forth in claim 1, wherein said radius of curvature is not greater than 10 mm.

3. The radial type ceramic turbine rotor as set forth in claim 1, wherein said radius of curvature is 4–6 mm.

4. A method of producing a radial type ceramic turbine rotor which comprises a shaft portion, a hub integrally connected to said shaft portion, a blade portion integrally formed on said hub, an end surface on a gas exit side of the hub extending from an end surface of said blade portion in the proximity of said hub, said method comprising the steps of injection molding a ceramic material into an injection molding die, said injection molding die producing a fillet at a circular connection between said blade portion and said end surface on the gas exit side of the hub, said fillet comprising a concave surface having a radius of curvature of greater than 3 mm, after sintering, removing a plasticizer from the injection molded rotor and sintering the rotor under atmospheric pressure.

5. The method as set forth in claim 4, wherein a ceramic material to be injection molded comprises at least one material selected from the group consisting of silicon nitride, silicon carbide, sialon and substances which produce these materials when sintered.

6. The method as set forth in claim 4, wherein the rotor is hydrostatically pressed prior to being sintered.

7. The method as set forth in claim 4, wherein the rotor is sintered in a nitrogen atmosphere.

8. The method as set forth in claim 4, wherein the rotor is heated to 500° C. for 10 hours to remove the plasticizer.

* * * * *